United States Patent [19]

Parker

[11] Patent Number: 4,611,460
[45] Date of Patent: Sep. 16, 1986

[54] LAWN MOWER BLADE WITH REPLACEABLE CUTTER

[76] Inventor: James D. Parker, Rte. 1, Box 327, Winfield, Mo. 63389

[21] Appl. No.: 791,601

[22] Filed: Oct. 25, 1985

[51] Int. Cl.$^4$ .......................................... A01D 55/18
[52] U.S. Cl. .................................................... 56/295
[58] Field of Search ........................ 56/295, 255, 13.6; 30/349

[56] References Cited

U.S. PATENT DOCUMENTS

| | | | |
|---|---|---|---|
| 2,786,322 | 3/1957 | McEvers | 56/295 |
| 2,932,147 | 4/1960 | Beeston, Jr. | 56/295 |
| 3,327,460 | 6/1967 | Blackstone | 56/295 |
| 3,514,935 | 6/1970 | Bonsor | 56/295 |
| 3,665,692 | 5/1972 | Hughes | 56/295 |
| 3,769,784 | 11/1973 | Jones | 56/295 |

FOREIGN PATENT DOCUMENTS 961413  5/1950  France .................................. 30/349

*Primary Examiner*—Gene Mancene
*Assistant Examiner*—David I. Tarnoff
*Attorney, Agent, or Firm*—Glenn K. Robbins

[57] ABSTRACT

A support blade with a replaceable cutter for rotary lawn mowers. The support blade has a recess at a top portion adjacent each end which receives a replaceable cutter element. The cutter has a body portion which fits snugly in the recess and a laterally extending cutter element which has a front knife edge for cutting and a rear portion which abuts against the blade support in such a fashion that thrust of the cutter is distributed against the blade support and the back of the recess. Protection against damage by foreign objects is provided by connecting the cutter to the top of the blade support by Allen screws fitting into tapped holes in the blade support.

7 Claims, 6 Drawing Figures

U.S. Patent  Sep. 16, 1986  4,611,460
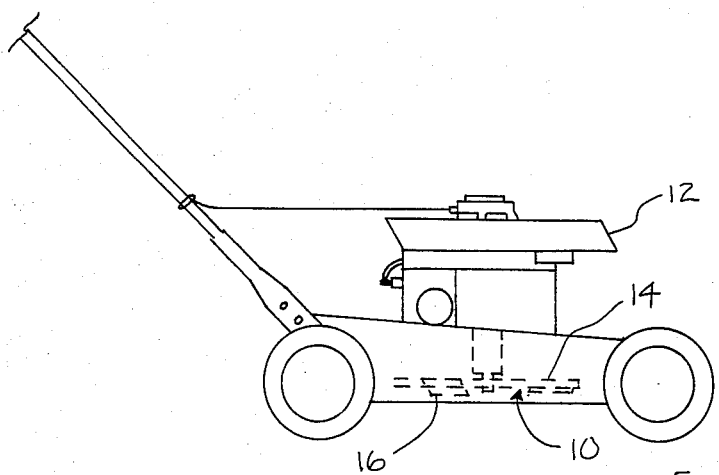
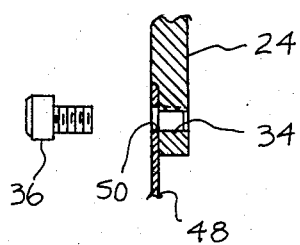
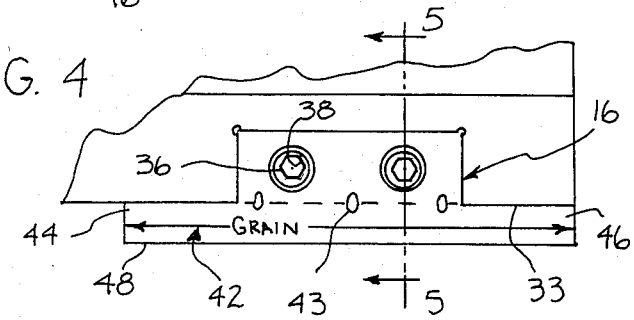
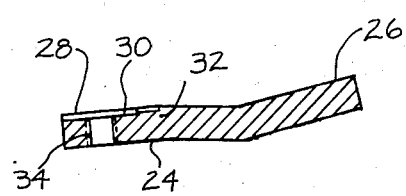
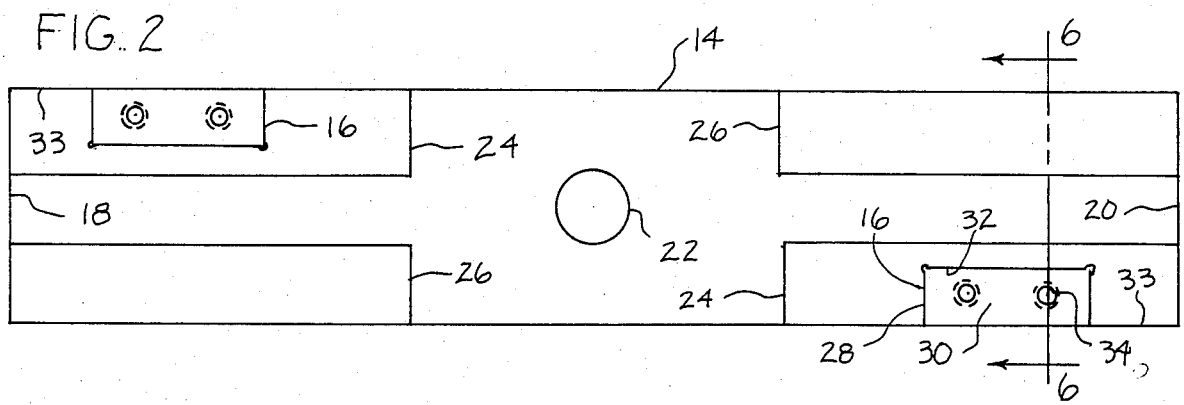
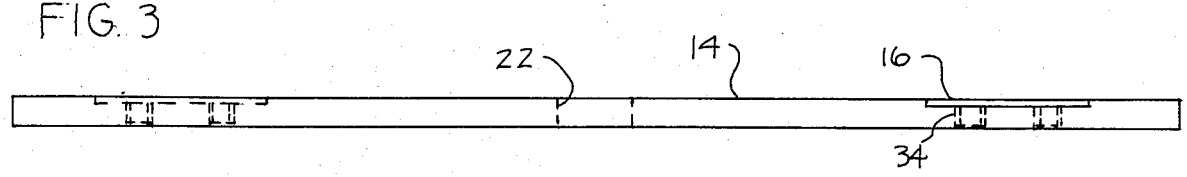

LAWN MOWER BLADE WITH REPLACEABLE CUTTER

BACKGROUND OF THE INVENTION

Rotary lawn mowers are conventionally provided with rotary blades having sharpened edges at opposite ends of the blades. The sharpened blades are subjected to wear by the average user and over a period of time necessitate resharpening which eventually decreases the life of the blade requiring complete replacement with significant expense. Such wear varies greatly depending upon extent of use and damage by foreign objects such as rocks and the like.

Various types of replaceable cutters have been proposed to avoid resharpening and eventual loss of the rotary blade. Such replaceable blades have presented problems of one type of another with regard to the requirement of complex fabrications, strength of the replaceable cutter, weakened resistance to damage by foreign objects, cost and the like. There has remained a need for a blade with a simply replaceable strong cutter which can be easily replaced at a reasonable cost.

SUMMARY OF THE INVENTION

By means of the instant invention there has been provided a mower blade with a replaceable cutter having substantial life and strength and ease of replacement. Conventional lawn mower blade configurations can be employed with a relatively simple modification to provide means for supporting the replaceable cutter.

In a preferred form a support blade is employed having at each end a slightly downwardly angled front edge and an upwardly engled trailing edge. The cutter is fashioned to be received in a recess or socket formed in the top side of the support and extends in the same plane as the front edge of the blade to present thrust action against the support blade. The angled trailing edge of the blade provides an updraft or suction to lift cuttings from the ground and facilitate the mowing or cutting action.

The cutter has a body portion which fits snugly within the recess or socket and bears against the support blade to absorb thrust. Cutting action is provided by a knife edge of a cutter head portion which extends along the front edge of the support blade and bears at the rear against the support blade. Thrust is thereby distributed both against the front edge of the support blade and the rear of the recess. The configuration of the cutter is generally T-shaped with the shank of the T being the body portion received in the support blade recess and the cutter head being the head of the T.

Connection of the cutter to the support blade is provided in a manner which avoids damage by the commonly occuring foreign objects encountered in the mowing operation. This connection is provided by the interfit of the cutter within the recess at the top of the support blade to avoid contact with rocks, branches or other foreign objects. Anchoring is effected by threaded tapped holes extending from the top side of the support blade into the recess. Allen screws having a hexagonal opening in the head of the screw for reception of an Allen wrench are employed for securing the cutter within the recess. Such screws with the internal hexagonal opening provide further protection against damage.

Through the afore-mentioned construction, a strong easily replaceable cutter has been provided which can be simply employed by the user. The cutter and support blade present a rugged and relatively inexpensive blade which can be used at low cost on rotary mowers of standard and varying designs to extend the life of the support blade over a long and indefinite period of time.

The above features are objects of this invention. Further object will appear in the detailed description which follows and will be further apparent to those skilled in the art.

For the purpose of illustration of this invention, a preferred embodiment is shown in the accompanying drawing. It should be understood that this is for the purpose of example and the invention is not limited thereto.

IN THE DRAWING

FIG. 1 is a view in side elevation of a mower equipped with the blade of this invention;

FIG. 2 is a top plan view of the mower support blade ready to receive the replaceable cutter;

FIG. 3 is a view in front elevation of the support blade of FIG. 2;

FIG. 4 is a fragmentary enlarged view of the right end of the support blade provided with the replaceable cutter;

FIG. 5 is a view in section taken of the line 5—5 of FIG. 4 showing an Allen screw in exploded position; and FIG. 6 is a view in section taken on the line 6—6 of FIG. 2.

DESCRIPTION OF THE INVENTION

The lawn mower blade of this invention is generally indicated by the reference numeral 10 where it is shown with a conventional rotary lawn mower 12. It is comprised of a support blade 14 which is attached to the lawn mower in the usual fashion and replaceable cutters 16 on the opposite ends 18 and 20 of the support blade.

The support blade is best shown in FIGS. 2, 3, 4 and 6. It has the usual hole 22 for attachment to the mower drive shaft although it will be understood that slots or the like may also be employed. The opposite ends are provided with a slightly downwardly angled leading edge portion 24 for improved cutter presentation in the mowing operation and a somewhat greater upwardly angled trailing edge portion 26. The latter portion creates an updraft or suction for the cutting to clear the ground to facilitate the mowing operation. While the afore-mentioned configuration of the end of the mower blade is preferred, it will be realized that flat and other shapes may also be employed for the end of the support blade.

In order to mount the cutter, a recess 28 or socket on the top of the support blade end is provided. The top mounting affords protection from damage by foreign objects or the like. This recess is of rectangular shape to prevent any tendency of the cutter to wobble and is of shallow depth with a flat bottom 30. A shoulder 32 at the bank of the recess serves as stop for the cutter. The recess is open at the front or leading edge of the blade and is separated from the end of the blade by section 33 of the blade edge which provides a bearing surface for a portion of the cutter as will appear.

For attachment of the cutter threaded holes 34 are tapped in the bottom of the recess. These holes pass through the body portion to the underside of the support blade. Allen screws 36 are employed to clamp the cutter in the recess. The screws terminate at their end flush with the underside of the blade to prevent thread damage. The Allen screws are of conventional construction having a hexagonal opening 38 in the screw head for reception of an Allen wrench in tightening and loosening the screws. The recessed opening 38 provides further protection against damage to the screw head by foreign objects.

The cutter 16 is best shown in FIGS. 4 and 5. It is comprised of a rectangular body portion 40 and a laterally extending head 42. The cutter is constructed of flat metal with the grain running longitudinally along the head 42 to provide strength and resistance to cracking. Ribs 43 are provided for additional strength. The ribs may be stressed for greater strength by bending the free end of the cutter extending beyond the support blade downwardly about 2°-3°. The cutter is generally T-shaped with the body portion 40 forming the shank of the T and the cutter head 42 forming the head of the T.

The cutter head has laterakky extending arms 44 and 46 which bear at their rear against the leading edge 24 and 33 of the support blade. A knife edge 48 is provided at the front to perform the cutting operation.

The cutter is dimensioned in such a fashion that the rear of the body portion bears against the shoulder 32 of the mounting recess while the rear of the cutter head arms 44 and 46 bear against the front edge of the support blade 24 and 33. In this fashion, the thrust encountered in the mowing operation is as evenly distributed as possible.

For attachment of the cutter to the support blade the aforementioned Allen screws 36 are employed. These are inserted in holes 50 provided in the body portion 40 of the cutter. The holes are of a sufficiently larger diameter than the shank of the screws to ensure that there is a slight freedom of fit when the cutter body portion and cutter head arms bear against the back shoulder of the recess and the front of the blade to ensure that there is no tendency of the cutter body portion to shear the shank of the screws when thrust is encountered. Instead of holes, slots extending perpendicularly to the front or leading edge of the support blade may be employed for this purpose.

USE

The use of the lawn mower blade of this invention is accomplished in the same fashion as a conventional unitary or integral blade. The connection to the mower is effected and upon operation the knife edge 48 of the cutter 16 performs the cutting and mowing operation as with a standard mower blade.

When replacement of the cutter is desired for one reason or another, the support blade is removed from the mower. Should the knife edges need resharpening, this may be simply effected. Should replacement of the entire cutter be necessary, the cutter is taken off by removing the Allen screws and a new cutter is mounted on the support blade.

In the use of the blade protection to the mounting structure is afforded by the top mounting of the cutter upon the support blade. None of the parts are exposed at the bottom side of the support blade. The use of Allen screws 36 in the tapped holes 34 which extend flush with the bottom of the support blade, provide a defense against damage by rocks and other foreign objects that would make the removal of the cutter difficult.

The mounting of the rectangular body portion of the cutter in the rectangular recess or socket coupled with the bearing of the cutter head arms against the front or leading edge of the support blade provides a great stability and resistance of the cutter against any wobble upon impact against the ground, rocks or the like often encountered in the mowing operation. The mounting structure is consequently rugged, and quite resistant to damage in the extremely varied type of wear encountered in the use of rotary lawn mowers.

Various changes and modifications may be made within this invention as will be apparent to those skilled in the art. Such changes and modifications are within the scope and teaching of this invention as defined in the claims appended hereto.

What is claimed is:

1. A lawn mower blade for use with rotary lawn mowers, said blade being comprised of an elongated support blade adapted to be connected to a lawn mower at a central portion thereof intermediate opposite ends of the support blade, said support blade having a recess at a top side of said supporting blade receiving a replaceable cutter therein, said cutter being comprised of a body portion closely receivable within said recess and abutting against a back thereof and a cutter head extending laterally from said body portion and abutting against a straight leading edge of said support blade and means for attaching said body portion to said support means on the top side of said support blade, said recess having an opening at a leading edge of said support blade adjacent an end thereof and said cutter head having a front knife edge and a rear bearing edge extending on opposite sides of said opening, said rear bearing edge abutting against said leading edge of the blade support on said opposite sides of said opening.

2. The mower blade of claim 1 in which said recess has a shallow flat bottom and said cutter head and body portions are coplanar with the body portion nesting closely within said recess.

3. The mower blade of claim 1 in which the means for attaching said body portion to said support blade comprises at least one threaded opening extending from the top side of said blade support into said recess and through a bottom side of said blade support and at least one Allen screw having a hexagonal opening in a head portion for reception of an Allen wrench and being receivable through a hole in the cutter body portion and in said threaded opening flush with the bottom of the support blade for clamping said body portion tightly against said support blade.

4. The mower blade of claim 1 in which said recess and body portion of the cutter have a mating rectangular configuration.

5. The mower blade of claim 4 in which the body portion and cutter head are integral and provide a T-shaped configuration to the cutter.

6. The mower blade of claim 3 in which the hole in the cutter body is sufficiently large to provide a free fit with a shank of the Allen screw to avoid shear force when the body portion is clamped in the recess and the cutter head bears against the leading edge of the support blade.

7. The mower blade of claim 1 in which the recess has a shoulder at the rear of the recess against which the body portion of the cutter bears.

* * * * *